United States Patent [19]

Horiike et al.

[11] Patent Number: 4,887,688

[45] Date of Patent: Dec. 19, 1989

[54] MOTORCYCLE

[75] Inventors: Satoru Horiike; Eiji Hamano, both of Tokyo, Japan

[73] Assignee: Honda Giken Kogyo Kabushiki Kaisha, Tokyo, Japan

[21] Appl. No.: 224,850

[22] Filed: Jul. 27, 1988

[30] Foreign Application Priority Data

Aug. 6, 1987 [JP] Japan .................................. 62-195314
Sep. 25, 1987 [JP] Japan .................................. 62-238661

[51] Int. Cl.⁴ .......................... B62D 61/08; B62K 5/04
[52] U.S. Cl. .................................... 180/229; 180/219; 280/111; 280/288.4
[58] Field of Search ............... 280/111, 112 A, 112 R, 280/289 S, 288.4; 180/210, 219, 227, 213, 9.26, 229; 296/78.1

[56] References Cited

U.S. PATENT DOCUMENTS

3,912,031 10/1975 Goulet .............................. 180/9.26
4,541,501 9/1985 Kawasaki ........................... 180/215
4,666,018 5/1987 Shibaya ............................. 180/213
4,686,656 8/1987 Morishima ........................ 280/289 S

Primary Examiner—Charles A. Marmor
Assistant Examiner—Donn McGiehan
Attorney, Agent, or Firm—Armstrong, Nikaido, Marmelstein, Kubovcik & Murray

[57] ABSTRACT

A motorcycle having a swingable front frame, a stable, non-swingable main frame, a front cowling supported by the main frame and covering a forward part of the motorcycle and an extension projecting laterally outwardly from each side of the front cowling. An air stream rectifier is provided in each laterally projecting extension of the front cowling.

11 Claims, 6 Drawing Sheets

MOTORCYCLE

BACKGROUND OF THE INVENTION

The present invention relates to a motorcycle capable of cornering at high speeds.

When cornering or turning a motorcycle, for example, when driving or cornering along a circumferential path it is necessary for a driver to have his body banked together with the motorcycle or vehicle body to the lateral side of the vehicle body toward the circumferential center to balance or overcome centrifugal force resulting from such a turn.

In a chassis frame of a conventional motorcycle, however, the front wheel supporting front frame and the rear wheel supporting main frame are formed integral. When banking such a vehicle body during cornering, the center of gravity of the entire vehicle body including the driver moves toward the lateral side of the body inside the turn because each frame banks simultaneously. Upon cornering during a high speed run, a greater extent or degree of banking is required which increases the change ratio of the center of gravity in proportion to the increase in speed.

The front and rear wheels supported on the front frame and the main frame of a conventional motorcyle have substantially the same width and are formed to allow the vehicle body to bank for cornering. Accordingly, during cornering, the ground gripping areas of the front and rear wheels which bank laterally toward one side of the vehicle body decrease in proportion to the banking angle of each frame.

Under these circumstances, the vehicle body is required to be banked to a larger extent when cornering at a considerable high speed such as during sports racing. Therefore, in a conventional motorcycle, the running speed of the motorcycle may have to be decreased during cornering depending upon several conditions.

To overcome the aforesaid disadvantages, it is an object of the present invention to provide a motorcycle capable of cornering at a high speed and capable of more effectively controlling the air streams at the lateral sides of a vehicle body during running to obtain a greater running stability than that obtained with a conventional motorcycle.

SUMMARY OF THE INVENTION

The present invention provides a motorcycle comprising a chassis frame including a front frame suspending a front wheel and a main frame suspending a rear wheel, the front frame and the main frame are connected together with the front frame forward of the main frame, and includes a connecting axle disposed between the main frame and the front frame. The front frame is supported on the connecting axle for swinging movement toward each side of the chassis and a rear wheel is provided on the main frame which has a width sufficient to prevent the main frame from turning relative to the connecting axle. A front cowling is supported by the main frame and covers a forward part of the motorcyle supported by the front wheel and the front frame and includes an extension projecting laterally outwardly from each respective side of the front cowling.

In the preferred embodiment an air stream rectifier is provided in each laterally projecting extension with each air stream rectifier defined by a front opening located at a forward end of the extension and an air passage provided internally of the extension and communicating the front opening with a rear opening. The rear opening may be provided in an upper or in a lateral side surface of the extension and, in the preferred embodiment, the air passage includes an air flow directing surface curving toward the rear opening.

In a preferred embodiment a fluid cooling radiator is provided internally of the air passage and the lower surface of the extension curves rearwardly and upwardly to develop a downward force resulting from air flowing between the lower surface of the extension and a surface traversed by the motorcycle.

An air intake opening and a second air passage may also be provided to each extension to provide a source of air for a carburetor or turbocharger.

The motorcycle of the present invention thus has a swingable front frame, a stable, non-swingable main frame, and a front cowling providing lateral extensions. Air stream improving devices are provided on the extensions of the front cowling which is preferably mounted to the main frame, whereby the air stream improving devices may rectify the air stream flowing in a direction from the forward to the rearward part of the vehicle body during running. The air pressure is thus directed to force the vehicle body downwards toward the ground. Also, other parts such as a fluid cooling radiator may be provided at desired locations on or in the extensions.

The present invention and the advantages provided thereby will be more fully understood with reference to the following detailed description of preferred embodiments of the invention and the claims taken together in conjunction with the accompanying drawings.

DESCRIPTION OF THE PREFERRED EMBODIMENT

The present invention will now be described in detail with reference to the accompanying drawings wherein like reference numerals and characters designate the same or like parts.

Figure 1:
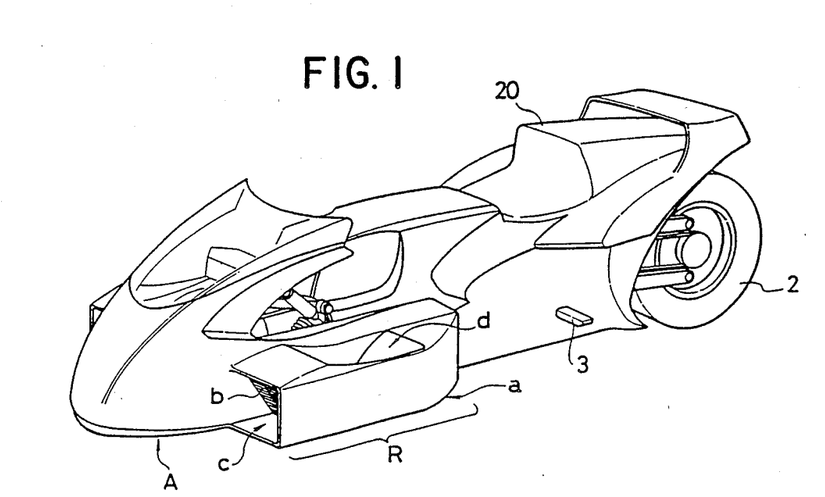
FIG. 1 is a perspective view of one embodiment of the present invention.

With reference to FIG. 1, there is shown a perspective view of one embodiment of the invention wherein reference character "A" denotes a front cowling and "a" denotes extensions of the cowling which extend laterally of the vehicle body at the front part of the vehicle body. Reference character b"denotes fluid cooling radiators which are provided within a forward or front opening "c" on forward portions of the extensions "a" and "d" denotes rearward openings of the extensions "a" through which an air stream introduced from the front opening "a" and passing through the radiators "b" is discharged. A pair of air stream rectifiers "R" are thus provided as part of the extensions "a", with the openings "c" and "d", the radiator "b", a rearward wall "e" and a lower wall "f" of the extension "a" as more clearly shown in FIG. 7 serving to rectify the air stream flowing along each side of the motorcyle vehicle body as will be further explained hereinafter. A relatively wide tire 2 having a flat tread is mounted on a rear wheel. A round tire A having a more conventional tread is mounted on a front wheel. A seat 20 is supported between the front and rear wheels.

Figure 2:
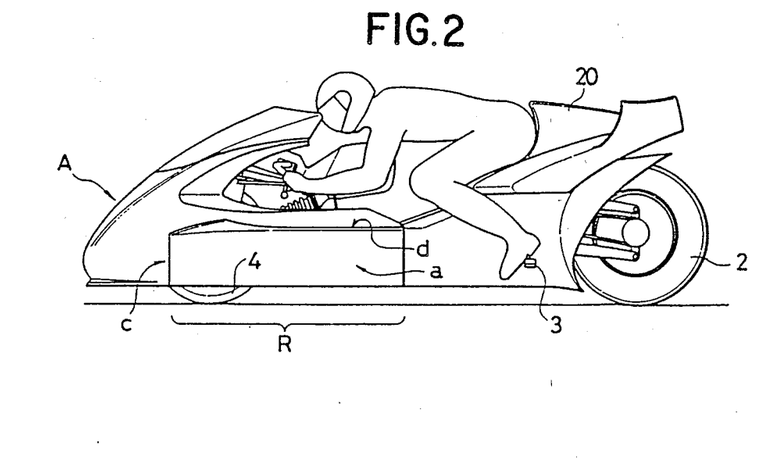
FIG. 2 is a side elevational view of the embodiment of FIG. 1.
Figure 3:
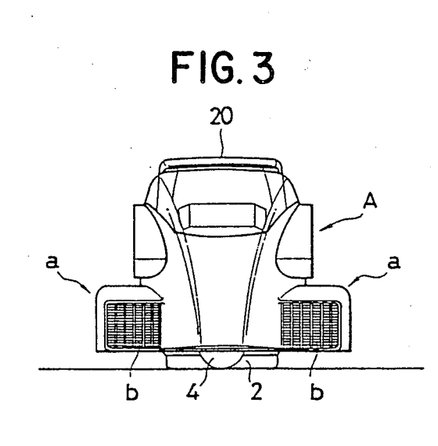
FIG. 3 is a front elevation of the embodiment of FIG. 1.
Figure 4:
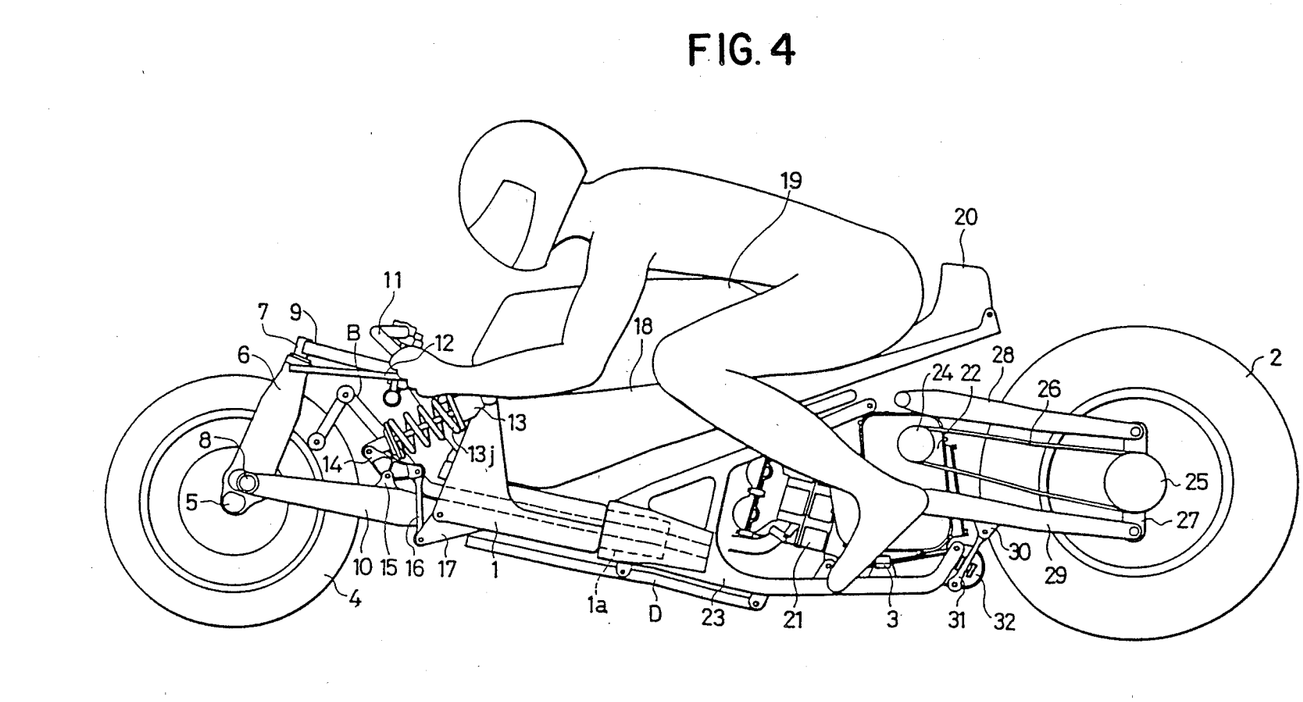
FIG. 4 is an explanatory view showing internal parts and structure of the embodiment of FIGS. 1 through 3.

The inner construction of the front cowling "A" as shown by FIGS. 1–3 will be explained with reference to FIG. 4. In FIG. 4, a front frame 1 and a main frame 23 are connected with each other to thereby constitute a chassis frame having an upwardly inclined front portion like a chassis frame of a conventional motorcycle.

As shown in FIG. 4, a front wheel 4 is suspended through a wheel axle 5 by a steering knuckle 6. Upper and lower swing arms 9 and 10 are each respectively connected at one end thereof through pillow ball/joints 7 and 8 to the upper and lower portions of the steering knuckle 6. The other ends of the swing arms 9 and 10 are pivotally connected to the front frame 1. One end of a steering rod 12 is mounted on the lower portion of the upper pillow ball/joint 7 of the knuckle arm 6. The other end of the steering rod 12 mounts the lower part of a steering handle or handlebar 11 which is provided on the front end of the front frame 1. The handlebar 11 is angularly rotatable in a plane generally parallel to the upper swing arm 9 and normal to a plane defined by the steering knuckle 6 and the upper and lower swing arms 9 and 10.

A regulating device 13 is arranged between the upper swing arm 9 and the lower swing arm 10, to regulate the upward and downward movement of the front vehicle body. One end of the regulating device 13 is mounted on the front frame 1 in common with the upper swing arm 9. The other end of the regulating device 13 is mounted through a link 14 and a bracket 15 on the lower swing arm 10 and connected through the link 14 and a link 16 to a bracket 17 of the front frame 1. The regulating device 13 is effective to raise or permit upward movement of the front of the vehicle body through the common mounting of the upper end of the device with the upper swing arm 9 and the links 14 and 16 pivotally connected between the brackets 15 and 17 which permit upward pivotal movement of the upper and lower swing arms 9 and 10 relative to the front frame 1.

A swingable frame 18 is provided on the upper part of the front frame 1. The swingable frame 18 is provided on the front frame 1 along a straight line extending between the mounting portions of the upper and lower swing arms 9 and 10 to the front frame 1, and is allowed to swing together with the front frame 1 about a connecting shaft or axle 1a which connects the front frame 1a to the main frame 23. The riding seat 20 and a fuel tank 19 are arranged and supported on the upper part of the swingable frame 18.

The main frame 23 has an engine 21, a transmission case 22 and other related conventional parts mounted thereon and is joined to the rear portion of the front frame 1 coaxially with the connecting shaft 1a of the front frame 1. A step or footrest 3 is provided on the lower portion of the main frame 23.

A chain 26 extends between a sprocket 24 provided to the transmission case 22 and a sprocket 25 disposed on an axle (not shown) for the rear wheel 2. Upper and lower swing arms 28 and 29 are each pivoted at one end to the transmission case 22. The other ends of the upper and lower swing arms 28 and 29 are coupled to upper and lower ends of a knuckle arm 27 arranged between the sprocket 25 and the axle of the rear wheel 2 and coaxially slidable on the rear wheel axle.

A rear cushion 32 is mounted on the main frame 23 and coupled to the lower portion of the lower swing arm 29 through a bracket 30 and a link 31.

The front cowling "A" of the present invention is mounted to the main frame 23 by front and rear mounting stays. The front mounting stay "B" for the front cowling "A" is coupled to the main frame 23 in a coaxial relation with the connecting shaft 1a between the main frame 23 and the front frame 1 so as to extend adjacent the lower area of the handlebar 11. A rear mounting stay "D" for the front cowling "A" is coupled through a bracket to the main frame 23 and extends from the main frame 23 to the lower portion of the front frame 1 along the inner surface of the front cowling "A".

Figure 5:
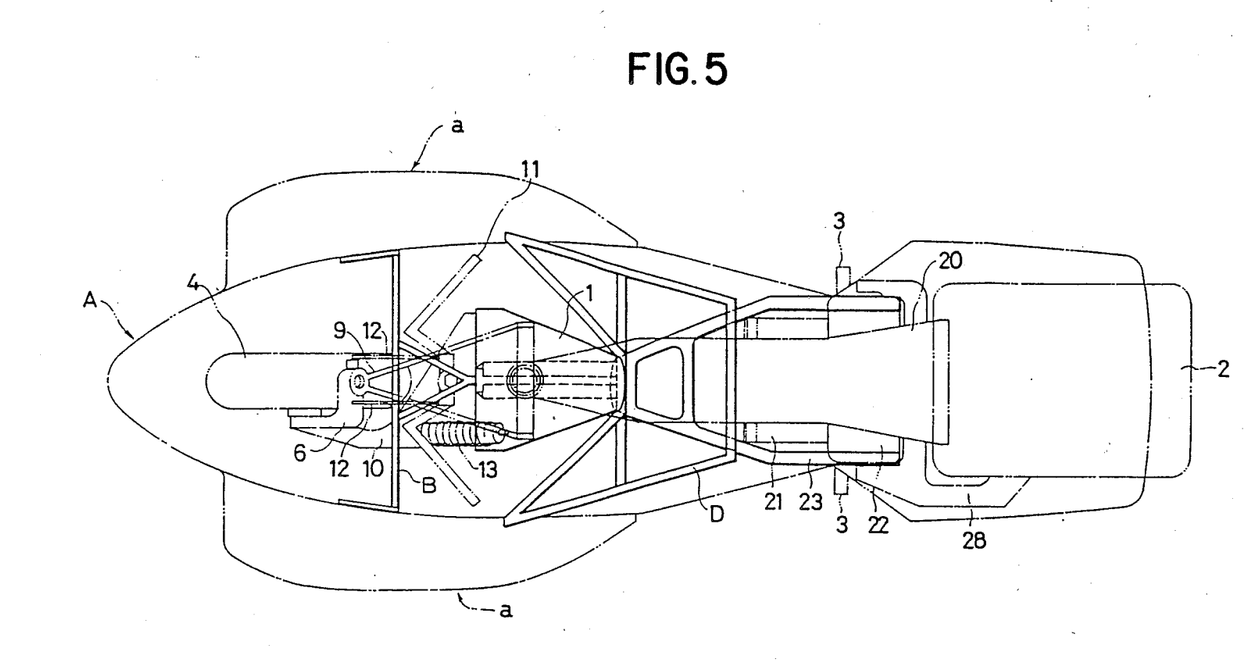
FIG. 5 is an explanatory sectional plan view showing the mounting between a front cowling and front cowling mounting stay of the embodiment shown in FIGS. 1 to 3.
Figure 6:
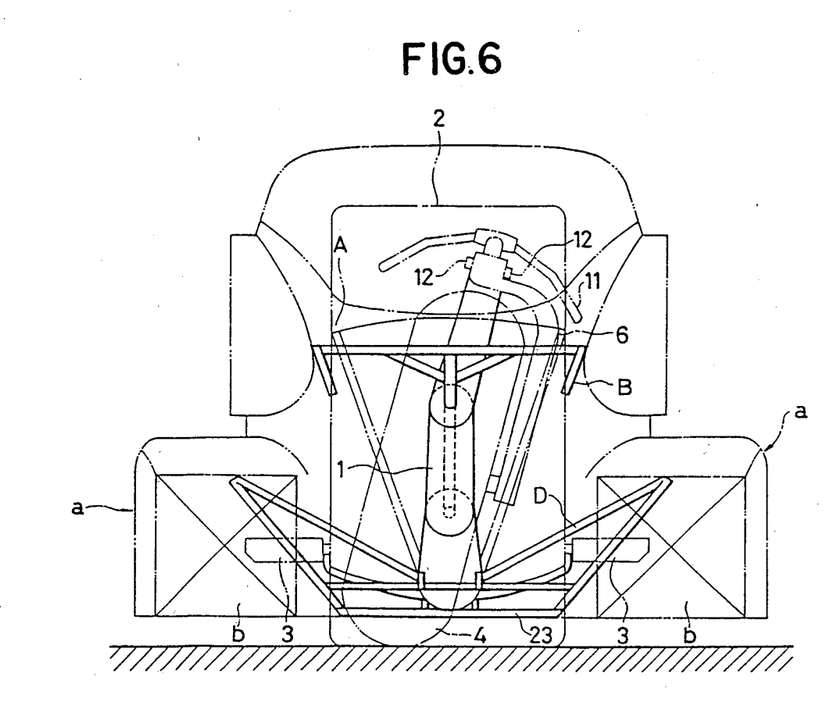
FIG. 6 is an explanatory front view illustrating the relative positions of certain parts of the embodiment shown by FIGS. 1 to 5 during cornering.

FIG. 5 shows not only the mounting condition of the front mounting stay "B" and the rear mounting stay "D" against the main frame 23 but also the mounting condition of the front cowling "A" against the mounting stays "B" and "D". As shown in FIGS. 5 and 6, the forward ends of the respective mounting stays "B" and "D" project laterally outwardly of the vehicle chassis frame to a considerable extent where they fixedly mount the front cowling "A" with the lateral ends of the mounting stay "D" secured internally of the projected portions or lateral extensions "a" of the front cowling "A".

The operation of a motorcycle incorporating the above described features of the present invention, especially during cornering at high speed, will now be explained in detail with reference to the drawings.

In FIG. 4, when the driver shifts his force to the banking direction through the handlebar 11 upon cornering in order to bank the vehicle body, the force is transmitted through the upper swing arm 9, the steering knuckle 6 and the lower swing arm 10 to the front frame 1. The front frame 1 swings around the connecting shaft 1a between the front frame 1 and the main frame 23, so that all of the forward components mounted on the front frame 1, such as the front wheel 4, seat 20 and fuel tank 10 are caused to bank or swing together with the front frame 1. At this time, a banking angle detector (not shown) provided in the regulating device 13 detects the banking angle of the front frame 1 thereby causing the front of the vehicle body to move upwards, and thus the handlebar 11 is raised up to a predetermined level.

The condition in which only the front frame 1 and those components mounted thereon are caused to bank will be explained in detail with reference to FIG. 6.

As shown in FIG. 6, upon cornering, the front wheel is caused to bank together with the front frame 1 through the manipulation of the handlebar 11, by the driver. The main frame 23, however, is prevented from banking because the rear wheel tire 2 mounted thereon has a wide flat tire tread and also because the force causing the above described forward components of the vehicle body to bank is not transmitted to the main frame 23. The front frame 1 pivots or swings about the connecting shaft 1a between the front frame 1 and the main frame 23 while the main frame 23 remains normal to the ground or other surface traversed by the motorcycle. Therefore, since each of the mounting stays "B" and "D" are coupled to and supported by the main frame 23, they are not banked, and the front cowling "A" and lateral extensions "a" of the front cowling "A" are maintained in a generally parallel condition relative to the ground.

The air stream rectifier "R" of the embodiment of the present invention shown by FIGS. 1–7 will be explained in detail hereunder with reference to FIG. 7.

Figure 7:
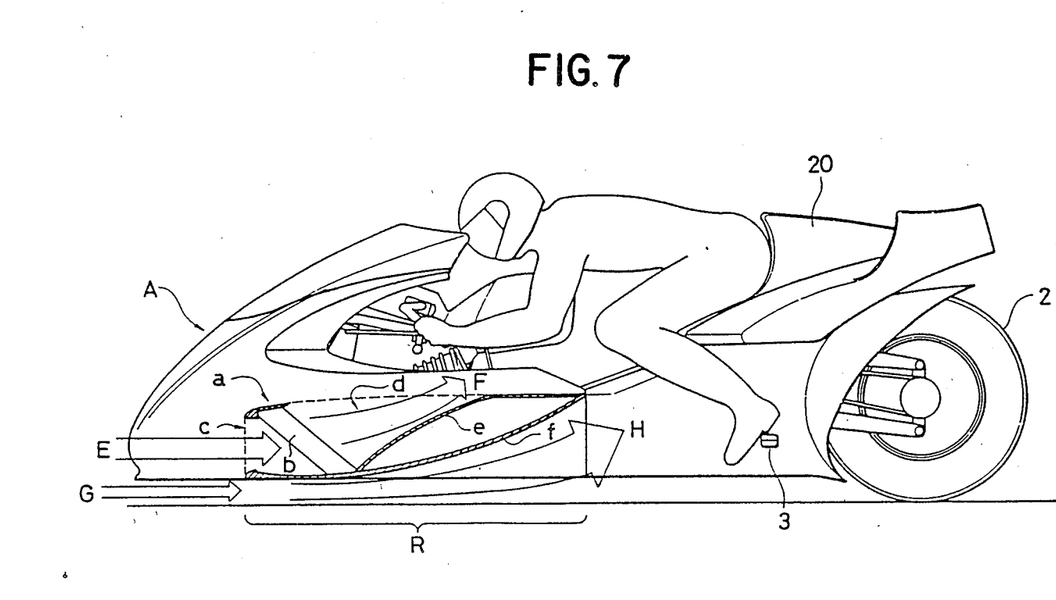
FIG. 7 is an explanatory side view partly in section and showing operation of an air steam rectifier of the embodiment shown in FIGS. 1 to 5.

As shown in FIG. 7, the air stream entering through the front opening "c" of the projected portion or lateral extension "a" in the direction of an arrow "E" during running passes through the radiator "b". At this time, the heat generated in the engine which is transferred to the radiator by a heated cooling fluid is a radiated and cooled by the air stream passing through the radiator "b". After passing through the radiator "b" the air stream then flows against the upwardly curved rearward wall "e" and is discharged out of the rear opening "d" of the air passage in the direction of an arrow "F". A reaction force is developed when the air flows against the rearward wall "e" and is guided upwards in the direction of the arrow "F", which forces the projected extension portions "a" downward as a result of the moving air pressure directed against the wall "e".

As also shown in FIG. 7, an air stream flowing in the direction of an arrow "G" is introduced from a narrow space forwardly of the projected portion "a" and between the lower wall or bottom surface "f" of the projected extension portion "a" and the ground in the direction of the arrow "G" and flows outward into a gradually widening space under the rear of the projected extension portion "a" as represented by the arrow "H". This air flow generates a negative pressure in the space below the lower wall "f" thereby cooperating with and enhancing the downward force generated by the air stream flowing through the front opening "c" against the internal rear wall "e" of the air passage.

Figure 8:
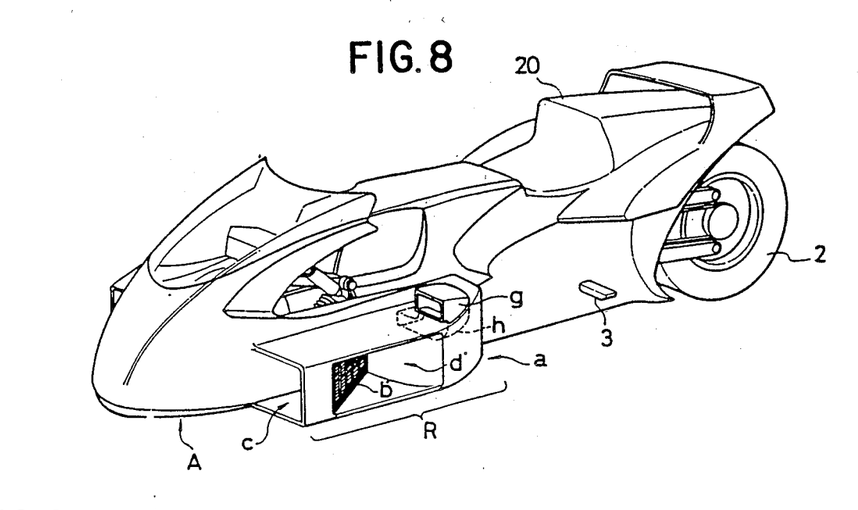
FIG. 8 is a perspective view showing another embodiment of the present invention.
Figure 9:
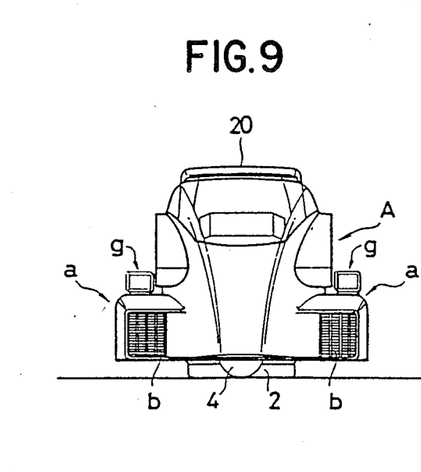
FIGS. 9 and 10 respectively show a front elevation and a side elevation of the embodiment of FIG. 8.
Figure 10:
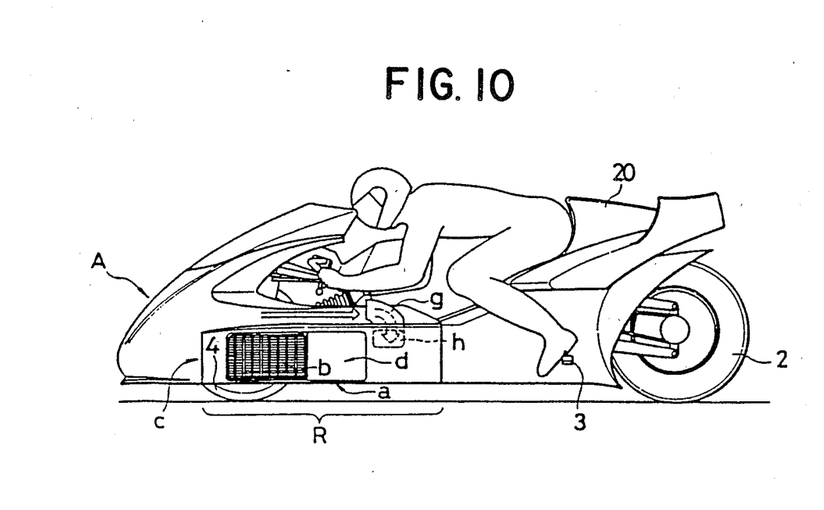

FIGS. 8 through 10 show another embodiment of the present invention, wherein the air passage of an air stream rectifier "R" has a rear opening "d'" provided through side surface of each extension "a" provided to the front cowling "A". Air passing through a radiator "b'" from a front or forward opening "c" flows out of the rear opening "d'". An air intake opening is provided in the forward face of an air intake scoop "g" mounted to the upper surface near the rear end of the lateral extensions "a". The air intake opening of the scoop "g" is connected to a second air passage in the form of a duct "h" through the extension "a" as shown by FIGS. 8 and 10, and is provided to positively supply air during running to a carburetor or turbocharger of the motorcycle engine fuel delivery system.

The embodiment of the invention according to the above construction, provides an improved suction efficiency to supply air to an engine fuel delivery system during running, and stabilizes both sides of the vehicle body by providing substantially equal wind pressure developed in the nonswingable laterally projecting portions or extensions "a" at both sides of the front cowling.

According to the present invention, a non-swingable front cowling is provided to a motorcycle having a swingable front frame and a non-swingable rear frame and air stream rectifiers are provided to lateral extensions projecting from each side of the front cowling.

The air stream flowing from forward to rearward of the vehicle body during running may be modified by the lateral extensions and the air stream rectifiers provided therein to develop a favorable air pressure forcing the vehicle body downward toward the ground. Also, other desired components like a radiator may be installed in the air passages through the extension. Accordingly, the present invention provides a motorcycle which permits high speed cornering and more effectively controls the air stream at each lateral side of the vehicle body to obtain greater stability during running.

Although preferred embodiments of the invention have been described in detail, the present invention is not to be construed as limited to the particular forms of the embodiments disclosed herein since the foregoing description is to be regarded as illustrative rather than restrictive and it should be understood that modifications and variations in the details of the construction may be made without departing from the spirit and the scope of the invention as defined by the claims appended hereto.

What is claimed is:

1. A motorcycle comprising:
    a chassis frame including a front frame suspending a front wheel and a main frame suspending a rear wheel,
    said front frame and said main frame being connected together by means disposing said front frame forward of said main frame,
    said means including a connecting axle disposed between said main frame and said front frame;
    said front frame being supported on said connecting axle for swinging movement toward each side of said chassis,
    said rear wheel having a width sufficient to prevent said main frame from turning relative to said connecting axle,
    a non-swingable front cowling supported by said main frame and covering a forward part of said motorcycle supported by said front wheel and said front frame, and
    an extension projecting laterally outwardly from each respective side of said front cowling wherein said front cowling and said extension maintain a generally parallel condition relative to the ground when said front frame moves toward either side of said chassis.

2. A motorcycle comprising:
    a chassis frame including a front frame suspending a front wheel and a main frame suspending a rear wheel,
    said front frame and said main frame being connected together by means disposing said front frame forward of said main frame,
    said means including a connecting axle disposed between said main frame and said front frame,
    said front frame being supported on said connecting axle for swinging movement toward each side of said chassis, said rear wheel having a width sufficient to prevent said main frame from turning relative to said connecting axle, a non-swingable front cowling supported by said main frame and covering a forward part of said motorcycle supported by said front wheel and said front frame, an extension projecting laterally outwardly from each respective side of said front cowling, wherein said front cowling and said extension maintain a generally parallel condition relative to the ground when the front frame moves toward either side of said chassis, and an air stream rectifier in each said extension.

3. The motorcycle defined by claim 2, wherein each said air stream rectifier comprises a front opening at a forward end of the extension, an air passage provided internally of said extension and communicating said front opening with a rear opening.

4. The motorcycle defined by claim 3, wherein said rear opening is provided in an upper surface of said extension and said air passage includes an internal air flow directing surface curving upwardly toward said rear opening.

5. The motorcycle defined by claim 4, wherein said extension includes a lower surface facing a surface traversed by said motorcycle and said lower surface of said extension is curved rearwardly and upwardly to develop a downward force resulting from air flowing between said lower surface of said extension and said surface traversed by said motorcycle.

6. The motorcycle defined by claim 2, wherein said extension includes a lower surface facing a surface traversed by said motorcycle and said lower surface of said extension is curved rearwardly and upwardly to develop a downward force resulting from air flowing between said lower surface of said extension and said surface traversed by said motorcycle.

7. The motorcycle defined by claim 3 wherein said rear opening is provided in a lateral side surface of said extension and said air passage includes an air flow directing surface curving outwardly toward said rear opening.

8. The motorcycle defined by claim 7 wherein said extension includes a second air passage and an air intake opening communicating with said second air passage and a duct delivering air from said second air passage to the fuel delivery system of said motorcycle.

9. The motorcyle defined by claim 8 wherein said air intake opening is provided by a scoop projecting outwardly from a surface of said extension.

10. The motorcycle defined by claim 3 further including a fluid cooling radiator provided internally of said air passage.

11. The motorcycle defined by claim 7 further including a fluid cooling radiator provided internally of said air passage.

* * * * *